US007089353B2

(12) United States Patent
Chainer et al.

(10) Patent No.: US 7,089,353 B2
(45) Date of Patent: Aug. 8, 2006

(54) RADIAL SELF-PROPAGATION PATTERN GENERATION FOR DISK FILE SERVOWRITING

(75) Inventors: Timothy J. Chainer, Putnam Valley, NY (US); Mantle Man-Hon Yu, San Jose, CA (US)

(73) Assignee: Hitachi Global Technologies Netherlands, B.V., Amsterdam (NL)

( * ) Notice: Subject to any disclaimer, the term of this patent is extended or adjusted under 35 U.S.C. 154(b) by 324 days.

(21) Appl. No.: 10/322,996

(22) Filed: Dec. 18, 2002

(65) Prior Publication Data

US 2004/0123025 A1    Jun. 24, 2004

(51) Int. Cl.
*G06F 12/00* (2006.01)
(52) U.S. Cl. .............................. 711/111; 360/75; 360/17
(58) Field of Classification Search ................. 711/111; 360/18, 72.1, 75, 70, 16, 17; 369/47.14
See application file for complete search history.

(56) References Cited

U.S. PATENT DOCUMENTS

| | | | |
|---|---|---|---|
| 5,612,833 A * | 3/1997 | Yarmchuk et al. ............ 360/75 |
| 5,907,447 A * | 5/1999 | Yarmchuk et al. ............ 360/75 |
| 6,519,107 B1 * | 2/2003 | Ehrlich et al. ................. 360/75 |
| 6,633,451 B1 * | 10/2003 | Chainer et al. ............... 360/75 |
| 6,687,069 B1 * | 2/2004 | Chainer et al. ............... 360/51 |
| 6,717,760 B1 * | 4/2004 | Hamaguchi et al. ........... 360/31 |
| 6,738,205 B1 * | 5/2004 | Moran et al. .................. 360/17 |
| 6,940,677 B1 * | 9/2005 | Fukushima et al. ........... 360/75 |
| 2005/0237655 A1 * | 10/2005 | Ehrlich ......................... 360/75 |

OTHER PUBLICATIONS

W.L. Cheung, et al., *Seamless Servowriting for High-Track Density Magneto-Resistive Sector Servo System*, IBM Technical Bulletin, vol. 38, No. 06, Jun. 1995, pp. 345-346.
T.C. Arnoldussen, et al., *Improved Dedicated Servo Pattern for Rigid Disk Magnetic Storage Systems*, IBM Technical Bulletin, vol. 38, No. 06, Jun. 1995, pp. 241-242.

* cited by examiner

*Primary Examiner*—Pierre-Michel Bataille
(74) *Attorney, Agent, or Firm*—F. Chau & Associates, LLC

(57) ABSTRACT

A method for writing a servopattern comprises writing a first burst at a first radial position, writing a second burst at a second radial position, wherein an edge of the first burst and an edge of the second burst have a substantially similar common radial position, and defining a portion of the edge of the first burst on a different revolution than defining a portion of the edge of the second burst.

24 Claims, 10 Drawing Sheets

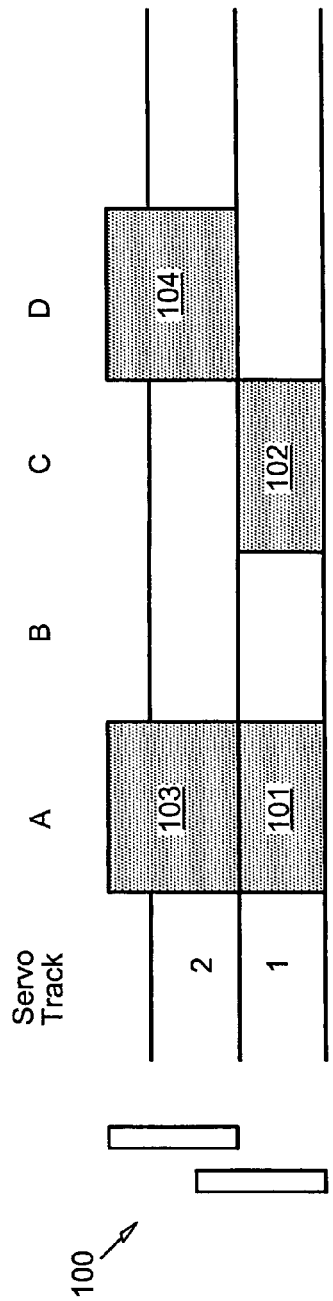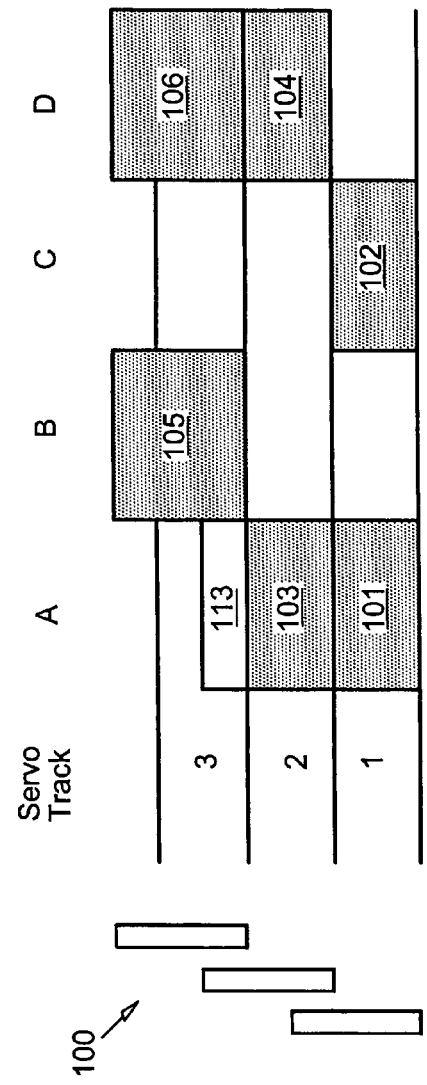
FIG. 1B (Prior Art)
FIG. 1C (Prior Art)

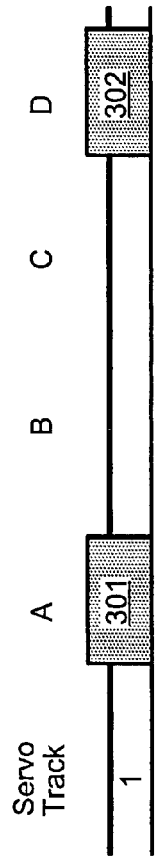
FIG. 3A Rev 1
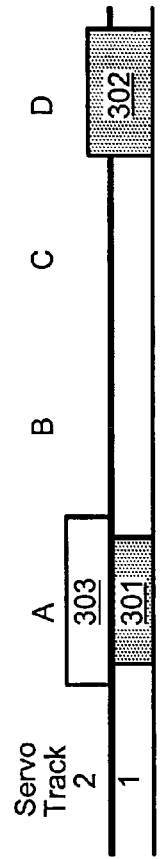
FIG. 3B Rev 2
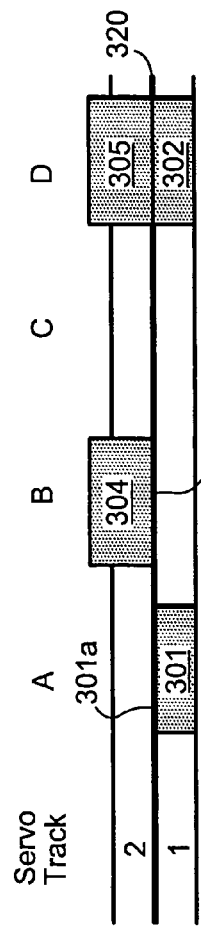
FIG. 3C Rev 3
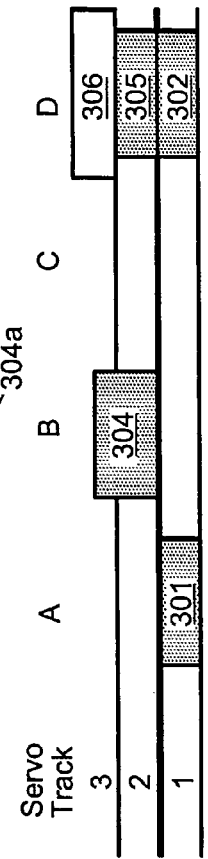
FIG. 3D Rev 4
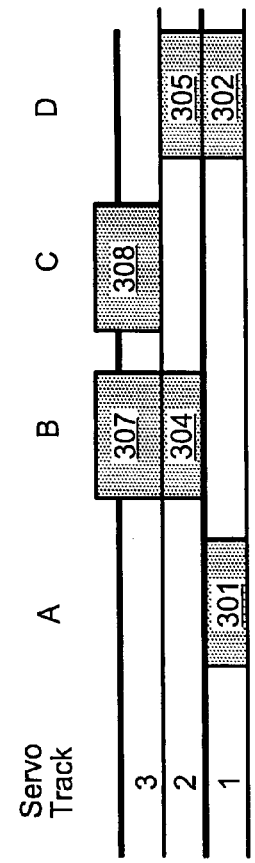
FIG. 3E Rev 5

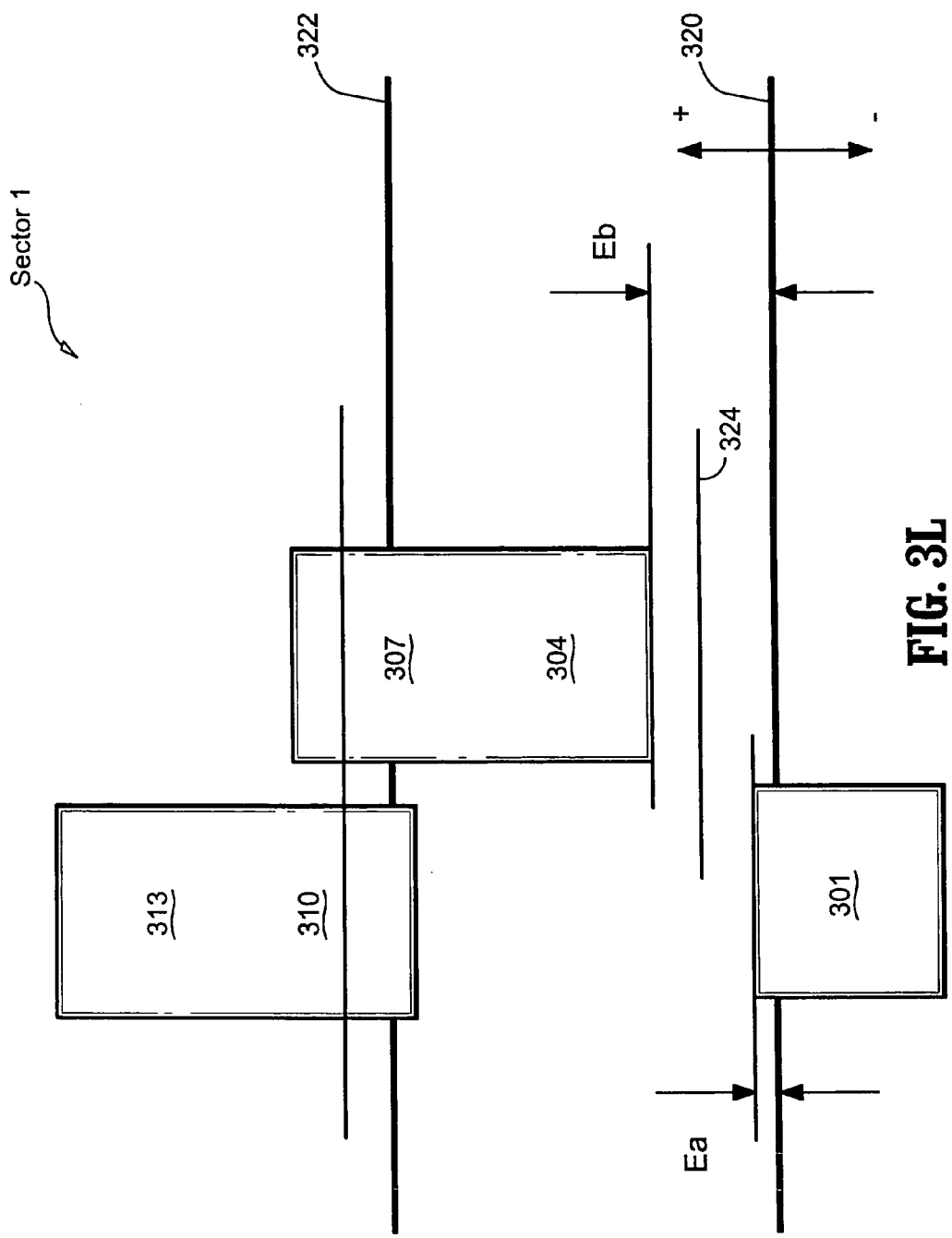

RADIAL SELF-PROPAGATION PATTERN GENERATION FOR DISK FILE SERVOWRITING

BACKGROUND OF THE INVENTION

1. Field of the Invention

The present invention relates to information storage devices, and more particularly to an improved servopattern for implementation in a storage device wherein errors introduced into the servopattern are reduced.

2. Discussion of Related Art

Increased levels of storage capacity in storage devices such as removable disk-drives, hard disk drives, and tape drives are a direct result of higher track densities possible with voice-coil and other types of servo positioners as well as the ability to read and write narrower tracks by using, for example, magnetoresistive (MR) head technology. Head positioning is accurately controlled using positional information stored on the disk itself known as embedded servo architectures.

Conventional servopatterns in an "embedded servo" disk drive architecture as shown in FIG. 1a comprise short servo bursts of constant frequency signal that precede data regions of the track and are used to align a head with respect to the track center. Although FIG. 1a shows 8 servo bursts, disk drives can have 200 or more servo bursts on a track, or one roughly every 2 degrees.

A typical servopattern used in DASD products, commonly referred to as half track servo patterns, deploys a servo pattern track pitch equal to one half of the product track pitch. The servo bursts are precisely offset to either side of a data track's center line (112 and 114) as shown in FIG. 1a. The track pitch comprises the write element width, which determines the width of the data track, plus the desired radial distance or separation between adjacent data tracks. The standard method of servowriting these patterns comprises two half tracks servo burst writes performed on separate revolutions which are joined together with a seam. As the width of the product write head is wider than the servo track pitch, each write results in a half track write, which is greater than the servo track pitch. As a result, the second half of the servo burst overhangs the track boundary. In a subsequent step the servoburst is trimmed such that the servoburst width is equal to twice the servo track pitch. This trimming step in which the write head trims the A burst, and writes the first half of the B and the second half of the D burst, occurs in the same revolution.

A commonly used servopattern, known as quad burst is shown in FIG. 1A. The servowrite process to write the quad burst pattern is described with respect to FIGS. 1B and 1C. As shown in FIG. 1B, with the recording write head on servo track 1 an A burst 101 and C burst 102 are written. The burst radial length is determined by the width of the write head and is typically wider than a servo track, which in the case described is half of the data track pitch.

The write head is then stepped forward one servo track. On servo track 2, servo bursts A 103 and D 204 are written. Servo burst A 103 is a second burst in slot A and overlaps a first burst in slot A 101 on servo track 1.

The write head is stepped forward to servo track 3. As shown in FIG. 1C, the write head trims the second burst in slot A 103 such that the A bursts, 101 and 103, are equal to two servotracks or one datatrack. Immediately after the trim operation, burst 105 is written in slot B and a second burst 106 is written in slot D, overlapping a first burst 104. The step of trimming burst 103 and writing burst 105 results in a correlation of an edge of burst 103 and an edge of burst 105 along a boundary formed between servo track 2 and servo track 3. As the location of the data track is determined by the edges of the A and B burst slots for that sector, any error in the position of the write head due to mechanical motion during the writing of that sector are written into the servopattern and become a permanent error that is commonly referred to as repeatable runout term. That is, because the A burst and B burst edges are defined during the same revolution, then non-repeatable mechanical motion of the head during the servowrite, or non-repeatable runout (NRRO), is written directly into the servo pattern track and becomes repeatable runout (RRO).

In disk drive servowriting, the NRRO and therefore written in RRO, is typically uncorrelated between adjacent tracks. The result is an error between adjacent track centers, referred to as AC squeeze, which is the square root of two (2) multiplied by the RRO. AC squeeze is a significant contributor to a track mis-registration budget that ultimately determines the drive track density and is an important limitation in determining the drive track density.

Seamless servo patterns in which servo bursts are comprised of a single write reduce RRO. However, the radial length of the servo burst for a seamless pattern is determined by the write element which varies significantly from the data track width. This variation in servo burst radial length results in large non-linearities of the position signal derived from the servo pattern by taking the normalized amplitudes of the A and B bursts and determining the difference A–B. As each recording medium has a recording transducer with a write element, the servo burst radial length and non-linearity will vary between recording surfaces.

Therefore, a need exists for a method of improving servopattern errors due to non-repeatable runout.

SUMMARY OF THE INVENTION

A method and system to decrease the magnitude of the errors introduced into position and/or servo information in the servowriting process.

Accordingly, the present invention is a servowriting method and system for reducing servopattern error while maintaining good servopattern linearity.

According to another embodiment of the present invention, a method for writing a servopattern comprises writing a first burst at a first radial position, writing a second burst at a second radial position, wherein an edge of the first burst and an edge of the second burst have a substantially similar common radial position, and defining a portion of the edge of the first burst on a different revolution than defining a portion of the edge of the second burst.

The first burst and the second burst are adjacent bursts in a servo track.

Defining comprises one of trimming a burst and writing a burst.

The errors during each revolution are uncorrelated.

The portion of the edge of the first burst is one of equal to the portion of the edge of the second burst and unequal to the portion of the edge of the second burst. The portion of the edge of the first burst is defined by one burst and the portion of the edge of the second burst is defined by one burst. The portion of the edge of the first burst is defined by one burst and the portion of the edge of the second burst is defined by multiple bursts. The portion of the edge of the first burst is defined by multiple bursts and the portion of the edge of the second burst is defined by one burst.

According to an embodiment of the present invention, a method for writing a servopattern comprises writing a burst to each of at least two slots of a first servo track, trimming a burst of at least one slot of the first servo track, and writing a burst to each of at least two slots of a next servo track, wherein at least one burst of the second servo track forms a servo burstdata track with an untrimmed burst of the first servo track, wherein the bursts written to the second servo track are written on a revolution different than a revolution for trimming the burst of the first slot.

The method comprises trimming the servo burstdata track.

Each revolution is uncorrelated.

The method further comprises defining burst edges of adjacent slots on separate revolutions.

Defining burst edges comprises one of trimming and writing.

The burst of the second servo track forming the servo burstdata track is written in two portions, each portion being written on a separate revolution. Each portion of the burst of the second servo track forming the servo burstdata track is trimmed on a separate revolution.

At least one edge of the servo burst is defined by more than one revolution.

The servo burst comprises two or more bursts.

According to an embodiment of the present invention, a program storage device is provided readable by machine, tangibly embodying a program of instructions executable by the machine to perform method steps for writing a servopattern. The method comprises writing a burst to each of at least two slots of a first servo track, trimming a burst of at least one slot of the first servo track, and writing a burst to each of at least two slots of a next servo track, wherein at least one burst of the second servo track forms a servo burst with an untrimmed burst of the first servo track, wherein the bursts written to the second servo track are written on a revolution different than a revolution for trimming the burst of the first slot.

BRIEF DESCRIPTION OF THE DRAWINGS

Preferred embodiments of the present invention will be described below in more detail, with reference to the accompanying drawings:

FIGS. 1B and 1C illustrate the servowrite process for a quad burst pattern;

FIGS. 3A–3I illustrate a writing method for a dual revolution seamed pattern according to an embodiment of the present invention;

FIG. 3*l* shows one sector of the disk drive servopattern in FIG. 3*j* according to an embodiment of the present invention;

DETAILED DESCRIPTION OF PREFERRED EMBODIMENTS

Figure 1A:
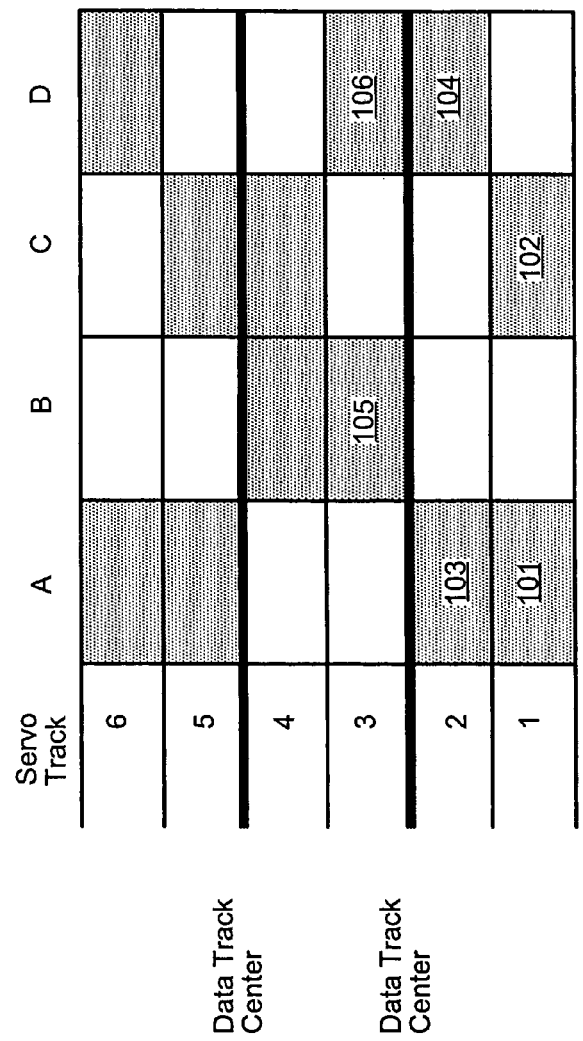
FIG. 1A shows a disk drive and a quad burst servopattern.
Figure 1A:
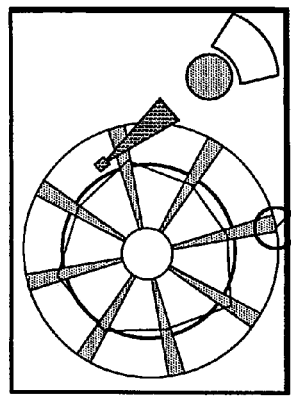

According to an embodiment of the present invention, to reduce the written-in RRO during servowrite, a dual revolution method trims the A burst on a separate revolution than the writing of the first half of burst B. Similarly, the C and D burst edges having a common radial position are written on separate revolutions. For adjacent tracks in which the RRO is uncorrelated the AC track to track squeeze is defined as:

$$\sqrt{2} \times RRO$$

In a dual revolution servowrite method according to an embodiment of the present invention, the NRRO on each revolution is uncorrelated, thus the written-in RRO can be reduced by:

$$\frac{1}{\sqrt{2}} \times \text{input\_NRRO}$$

where NRRO and RRO can be measured in, for example, microns or percent of servo or data track pitch.

The correlation between waveforms can be defined mathematically by the autocorrelation function. If we define two NRRO waveforms s(t) and r(t) taken on different revolutions of the rotating media then the correlation between the waveforms is given by $$\frac{\sum_t (s(t) * r(t))}{\sqrt{\sum_t (s(t) * s(t))} \sqrt{\sum_t (r(t) * r(t))}}$$

In the case where the waveforms are identical r(t)=s(t) and therefore 100% correlated the function has a value of 1. For waveforms which are random and uncorrelated the autocorrelation value is 0. A value between 1 and 0 indicates the degree of correlation between the waveforms.

By reducing the RRO, the AC squeeze error between data tracks can be reduced and improved track densities can be achieved in a storage system implementing dual revolution servowrite system and method according to an embodiment of the present invention. Further, the concepts disclosed by the present invention are also applicable to reducing the errors due to other noise sources, for example, magnetic center sift of a readback sensor, whose correlation is eliminated by adding an additional revolution.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 2:
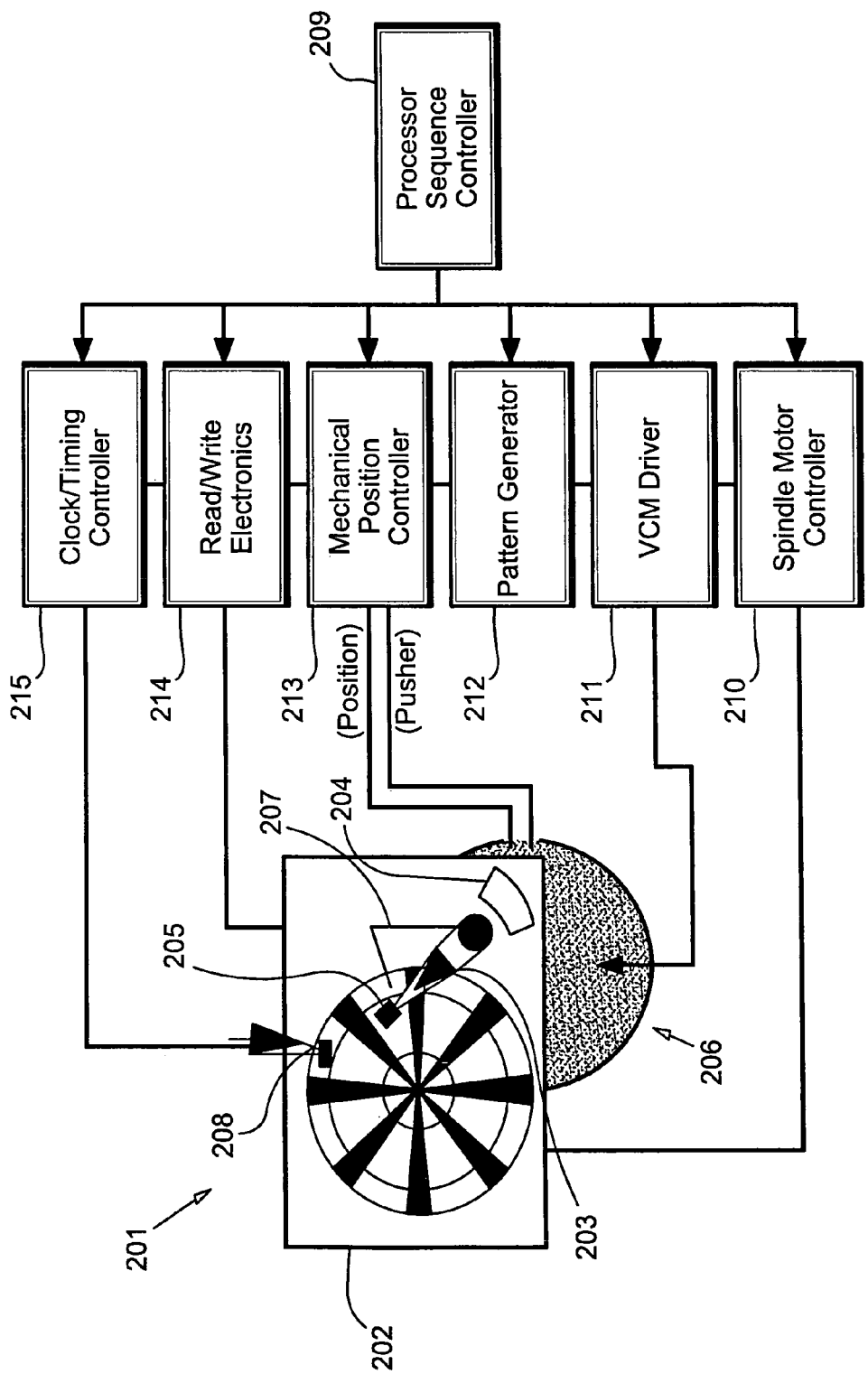
FIG. 2 is a block diagram of a servowriter according to an embodiment of the present invention.

FIG. 2 illustrates the components of a servowriter system according to an embodiment of the present invention.

A disk drive 201, which comprises a rotating medium 202 and an actuator 203, is mechanically mounted into the servowriter system. The actuator 203 comprises a voice coil motor (VCM) 204 and a recording transducer 205, which has both read and write elements.

The servowriter comprises a mechanical fixture 206 to clamp the disk drive 201 such that a mechanical pusher pin 207 can make contact with the disk drive actuator 203 and provide external positioning capability. A clock head 208 is lowered onto the disk 202 to provide a circumferential sensor.

The servowriter electronics sequence controller 209 commands the electronics to turn on the spindle motor using controller 210, bias the actuator against the pusher pin using VCM driver 211, position the recording transducer write head radially using the mechanical position controller 213, determine the circumferential position of the write element using the clock timing controller 215 and clock head 208, and write a sequence of magnetic transition onto the disk surface using a pattern generator 212 to hold the sequence and the read/write electronics 214 to send a write signal to a write head of the recording transducer 205.

Using these elements the servowriter can write a pattern onto the recording surface 202 at a predetermined radial and circumferential location. Variations in the location may occur due to mechanical and/or electronic noise. The operating functions of these elements are well understood in the disk drive industry. To reduce the written-in errors during servowrite a dual revolution method according to an embodiment of the present invention trims the A burst 301 on a separate revolution than the writing of the first half of Burst B 304 as shown in FIGS. 3B and 3C. In this way the two edges are written on independent revolutions. If the NRRO on each revolution is uncorrelated then the written-in error, or RRO, will be reduced by:

$$\frac{1}{\sqrt{2}} \times \text{input\_NRRO}$$

Figure 3F:
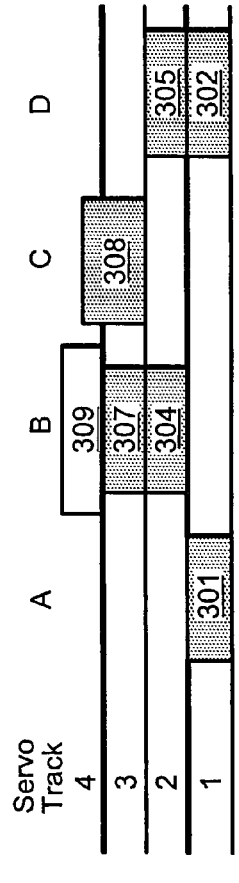
Figure 3G:
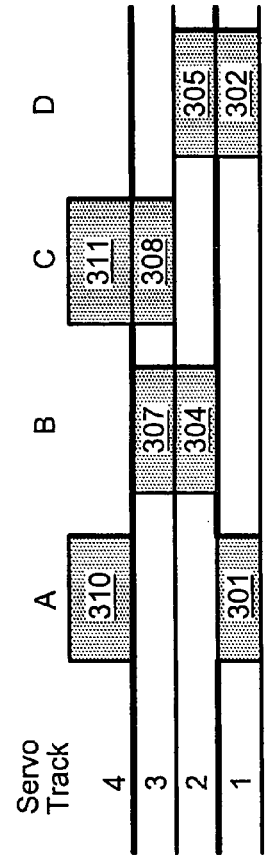
Figure 3H:
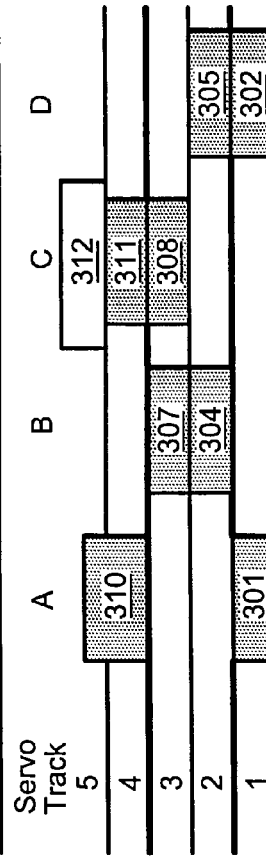
Figure 3I:
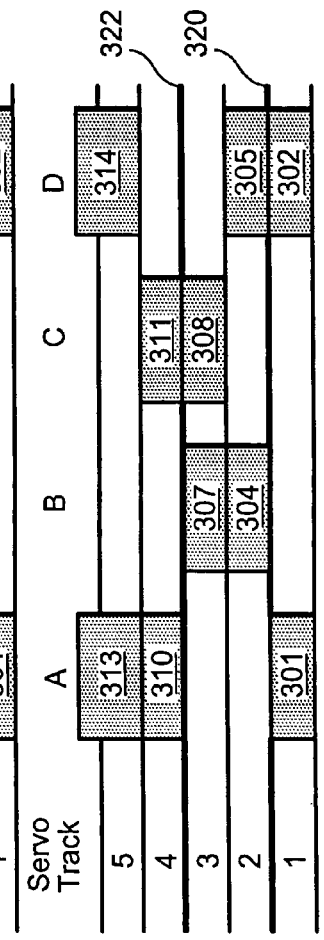

A method of servowriting with the dual revolution process with a four burst product servowrite pattern is illustrated in FIGS. 3A through 3I. On revolution 1, shown in FIG. 3A, the A burst 301 and D burst 302 are written on servo track 1. On revolution 2, shown in FIG. 3B, a portion of the A burst 301, which overlaps into servo track 2, is trimmed 303. On revolution 3, shown in FIG. 3C, burst B 304 and a second half of burst D 305 are written on servo track 2. At this point, it can be seen that an edge of burst A 301a and an edge of burst B 304a have a substantially similar common radial position. That is, the mean values of the radial positions, for example, measured in microns, of all bursts written in the A and B slots along a given center line are about equal. The second half of burst D 305 is trimmed 306 on revolution 4, as depicted in FIG. 3D. On revolution 5, shown in FIG. 3E, a second half of the B burst 307 is written on servo track 3, as well as burst C 308. The second half of burst B 307 is trimmed 309 from servo track 4 on revolution 6. On revolution 7, an A burst 310 is written on servo track 4. A second half of the C burst 311 is written is also written on servo track for on revolution 7. On revolution 8, the second half of burst C 311 is trimmed 312. Referring to FIGS. 3A and 3I, the A burst 301 and D burst 302 are written on servo track 5, which is the beginning of a servowrite pattern begun on servo track 1. Thus, the A and B burst edges and C and D burst edges are written on separate revolutions.

In FIG. 3I the data track centers are shown as elements 320 and 322 which in this example of half track servo are two servo tracks apart.

The servowritten data track center is determined by the location of the A and B burst edges for each sector. The data track center for each sector is obtained by reading the normalized amplitudes of the A and B bursts for each sector using the read transducer, determining the difference of A−B and determining the radial location where the amplitudes of the A and B bursts are equal resulting in a position signal A−B=0. The normalization is done by measuring the maximum amplitude with the read transducer centered on a servo burst and then dividing the measured value by the maximum amplitude to produce a normalized value from 0 to 1.

Figure 3J:
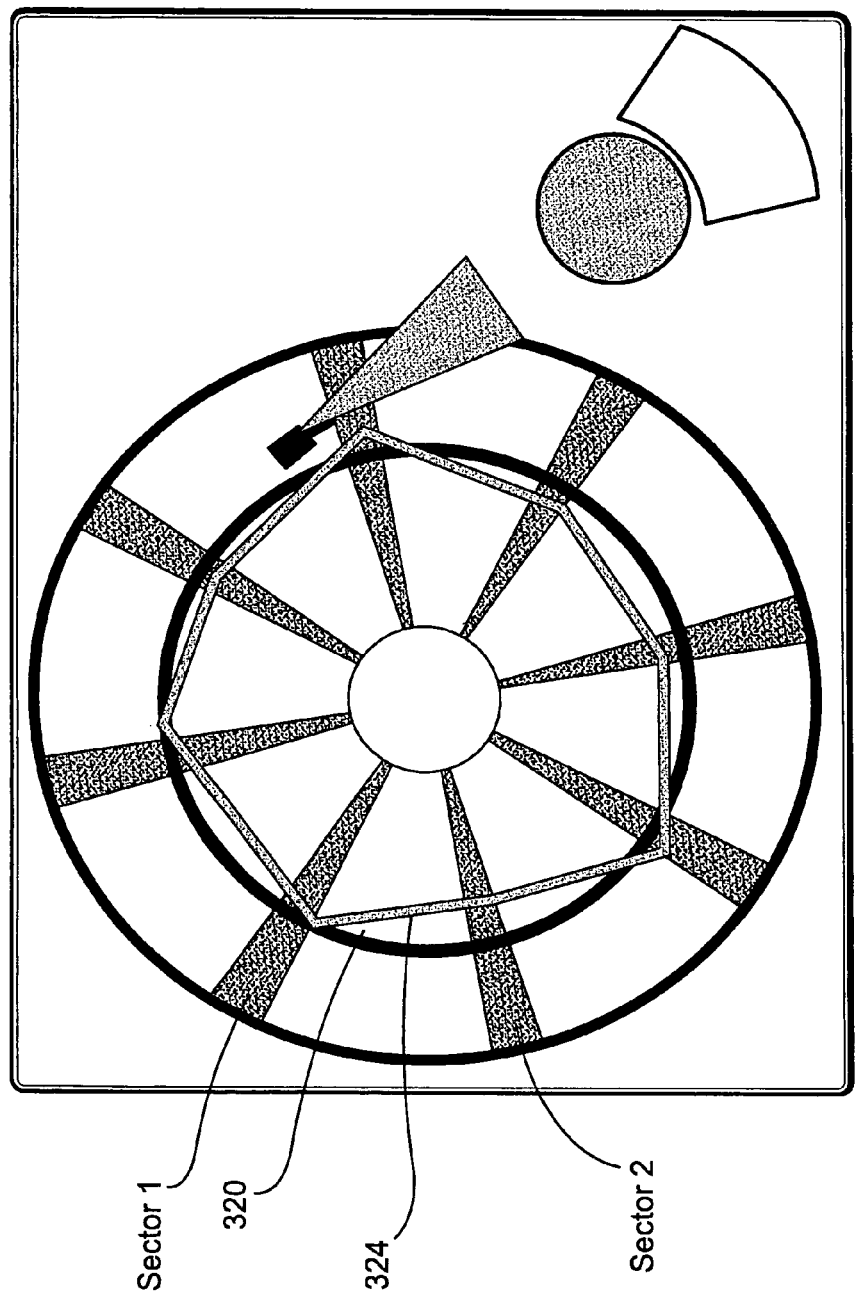
FIG. 3*j* shows a disk drive with a target track and a servowritten track.

In practice, mechanical motion (NRRO) during servowrite results in sector by sector error between the servowritten data track center 324 and the ideal target data track 320 as shown in FIG. 3J. There may be other sources that contribute to servopattern errors, but for the purpose of this discussion only mechanical errors are included in the description.

Figure 3K:
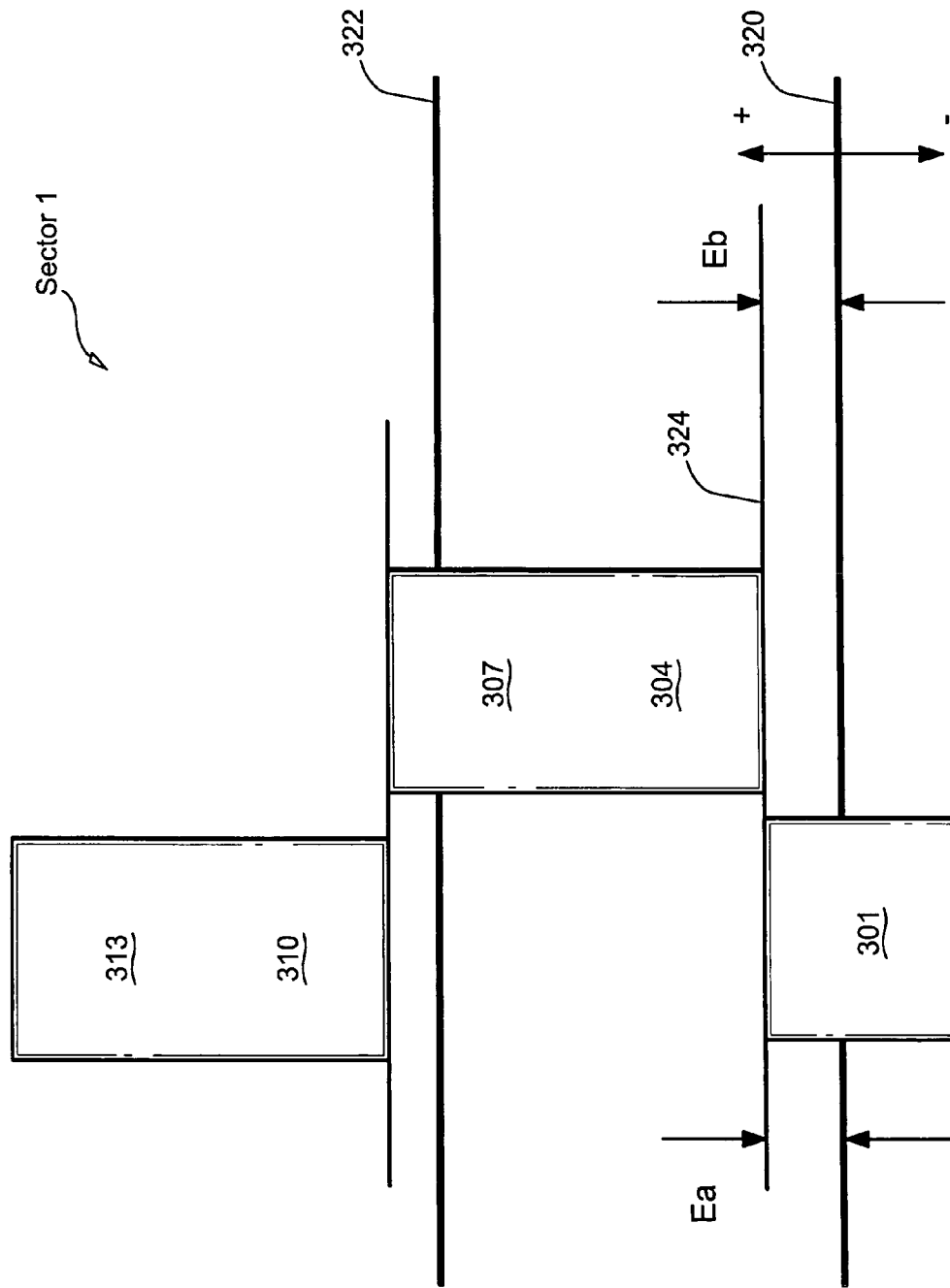
FIG. 3*k* shows one sector of the disk drive servopattern in FIG. 3*j*.

Referring to FIGS. 3J and 3K, one sector is shown in which the errors in the placement of the A and B bursts edges result in a deviation between the servowritten track center and the target data track center shown as Tc 324. The errors occur on each sector along a track with a standard deviation or sigma.

In the case when the trimming of the A burst and writing of the B burst edges occur sequentially during the same revolution the location of the A and B burst edges are correlated and the error between the servowritten track center and the target track center is given by:

$$Tc=(E_a+E_b)/2$$

As the errors in the edge of the two bursts are equal Ea=Eb, then Tc 324 is equal to Ea. Therefore the standard deviation of Tc 324 is equal to the NRRO sigma when servowriting. As the errors are permanently written into the servopattern the servopattern has a repeatable runout (RRO) whose sigma is equal to the NRRO sigma.

However, according to an embodiment of the present invention, when the A and B bursts are servowritten on different revolutions of the disk the errors in their locations due to NRRO are uncorrelated as shown in FIG. 3I. The track center is again given by $$Tc=(E_a+E_b)/2$$

However, Ea is not equal to Eb as the errors occur on different revolutions and are uncorrelated. Therefore the sigma of Tc 324 is given $$\sigma_{TC} = \sqrt{(\tfrac{1}{4}\sigma_{Ea}^2 + \tfrac{1}{4}\sigma_{Eb}^2)}$$

As the sigma of the errors Ea and Eb are equal to the sigma of the NRRO, then the sigma in Tc 324 reduces to $$\frac{1}{\sqrt{2}}$$

times the sigma of the NRRO.

$$\sigma_{RRO} = 1/\sqrt{2}\,\sigma_{NRRO}$$

Reducing the RRO also reduces the track-to-track alignment error, or AC squeeze, between data tracks. The AC squeeze is the variation in the distance between adjacent tracks sector by sector. For adjacent tracks in which the RRO is uncorrelated, the AC squeeze sigma is defined as:

$$\sigma_{AC\ Squeeze} = \sqrt{2} \times \sigma_{RRO}$$

As compared to a standard servowrite process, a dual revolution servowrite method according to an embodiment of the present invention reduces the sigma in the RRO by $$\frac{1}{\sqrt{2}},$$

and therefore also reduces the AC Squeeze, by the same factor:

$$ACSquuezeDual = 1/\sqrt{2} \times \sigma ACSqueezeStandard$$

Figure 4:
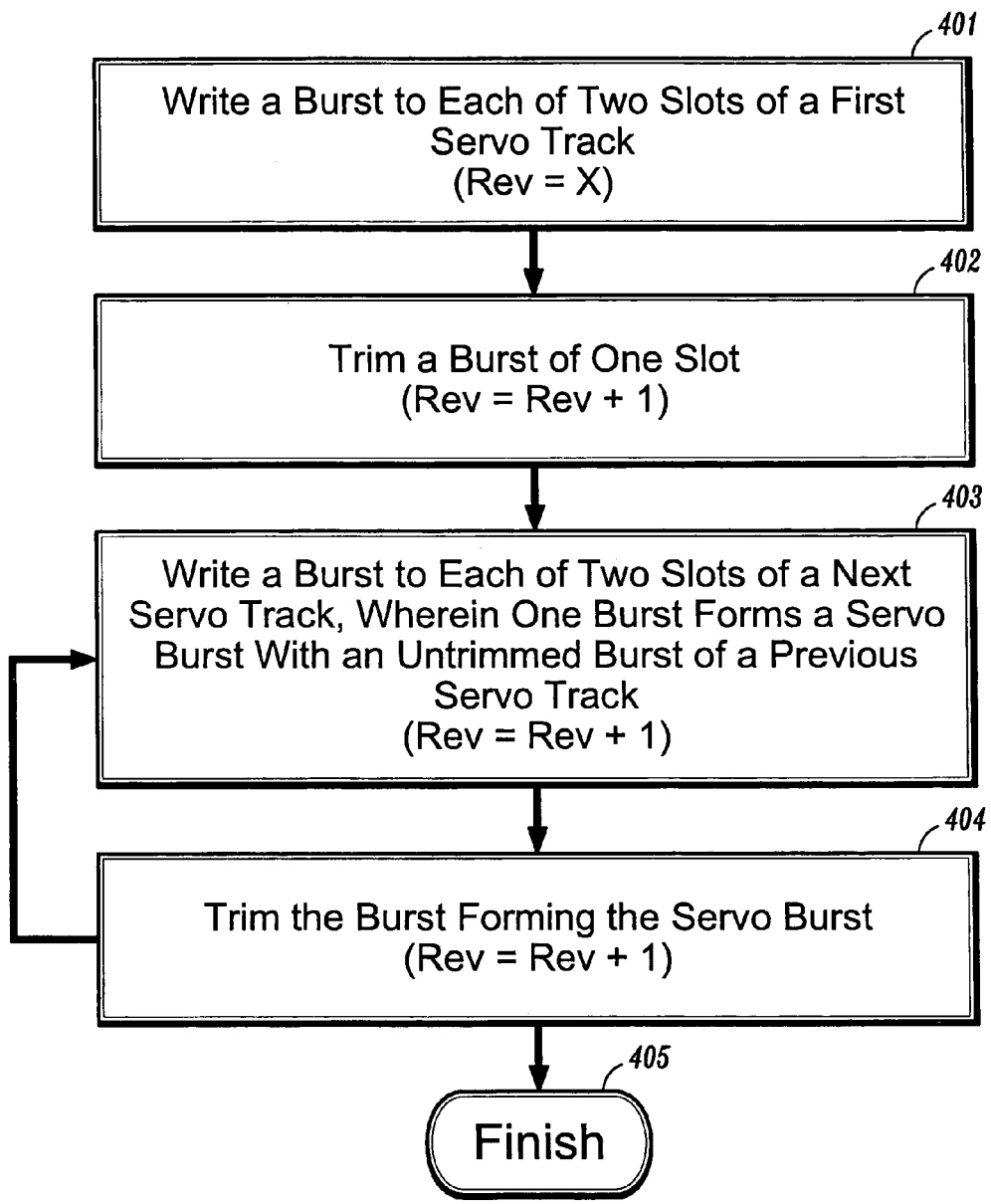
FIG. 4 is a flow chart of a method according to an embodiment of the present invention.

Referring to FIG. 4, a burst can be written to each of two slots of a first servo track 401. A burst of one slot of the first servo track can be trimmed 402 prior to writing a burst to each of two slots of a next servo track 403. One burst of the second servo track forms a servo burst with an untrimmed burst of the first servo track, wherein the bursts written to the second servo track are written on a revolution different than a revolution for trimming the burst of the first slot. Further, the burst forming the servo burst is trimmed 404. The method continues to write and trim until the end of a write command 405, for example, as controlled by the processor sequence controller 209. It should be noted that a servo burst can comprise more than two bursts, for example, having three bursts written on different revolutions.

Figure 5:
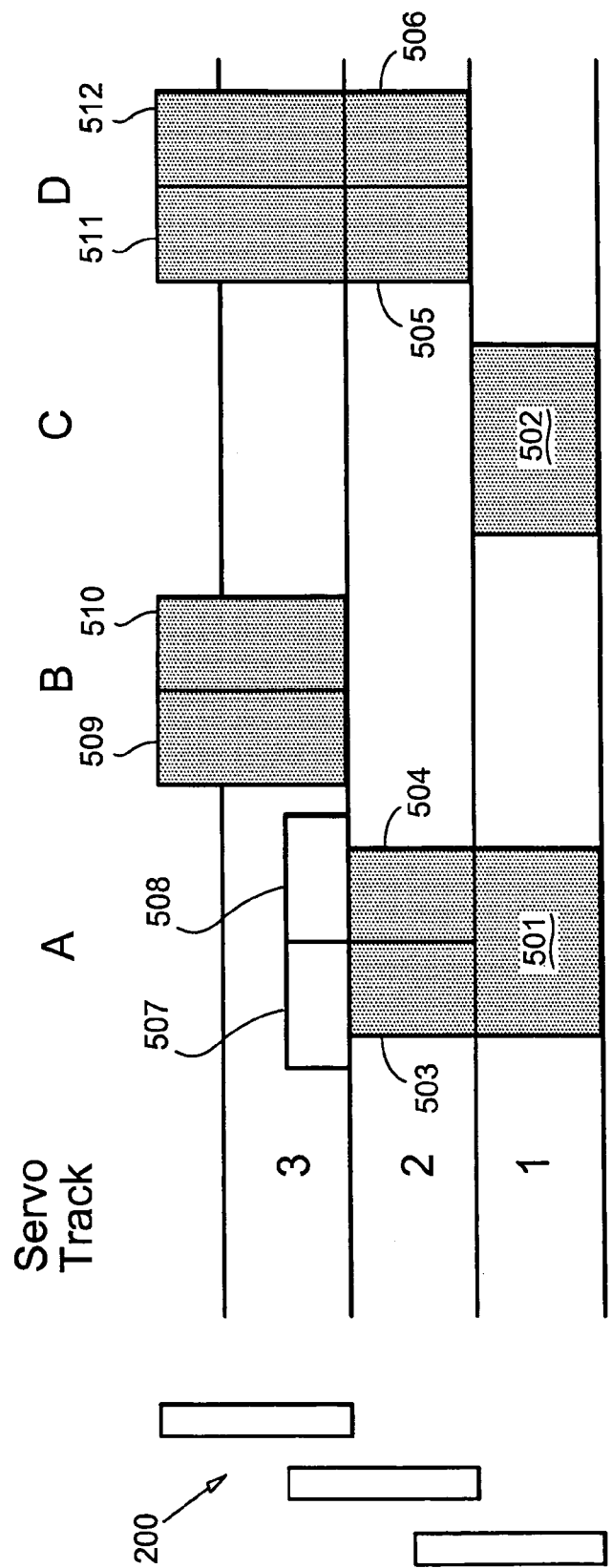
FIG. 5 shows a multiple revolution seamed pattern according to an embodiment of the present invention.

Using the same principals of the dual revolution method, the present invention may be extended to deploy multiple revolutions to further reduce the written error. As shown in FIG. 5, after writing the first halves of the A and C bursts, 501 and 502 respectively, a second half of burst A may be divided into two parts (503, 504) with each part trimmed on an independent revolution. The trim 507 of a first portion of the second half of the A burst 503 may occur on a separate revolution of the trim 508 of the second portion 504. In a similar manner, a B burst may be equally divided and written on two (2) revolutions shown as 509 and 510. In the case described the edges of 503, 504, 509 and 510 are all written on separate revolutions and thus the error in the servowritten data track due to NRRO is averaged by √4 for random noise components. In addition, a portion of a first burst can be written during the same revolution as a first portion of a second burst, for example, portion 503 or 504 can be written on the same revolution as either portion 505 or 506 and portion 509 or 510 can be written on the same revolution as either portion 511 or 512. While this is shown for splitting a burst into two (2) parts, any number N may be used where N is less than or equal to the number of magnetic transitions in a burst. Also, it should be noted that N does not need to be equal for both the A and B bursts, however the reduction in the RRO sigma is dependent on the values of N chosen for each burst.

There also exist servopatterns in which A and B bursts are written at different frequencies and/or phase. In these cases both bursts A and B can occupy the same slot A and both C and D burst can be in the same slot C of FIG. 5. If the A and B bursts have the same frequency and are 180 degrees out of phase then the signal detected by the read transducer is equal to A−B. If the A and B bursts are written at different frequencies (e.g. non-integer multiples) then the signal amplitude of the A and B bursts can be determined by signal processing to produce A−B. In both of these examples the common radial edge of burst 509 would overlap with burst 503 and the common radial edge of burst 510 would overlap 504. The location of the common radial edge between 509 and 503 would be determined by the write of burst 509 and similarly the location of the common radial edge between 510 and 504 would be determined by the write of 510. As a result the write of 503 and 504 can be performed on the same revolution and the write of 509 and 510 can be performed on different revolutions to reduce the RRO by √2.

The present invention can be implemented in self-servowriting or servocopy systems as well as the previously described external servowriter. In self-servowrite or servo-copy methods the positioning is derived from a servoed system, but the same principals apply.

Reducing errors in servopattern write is important to achieving high track density in storage systems. To increase track density errors in the placement of tracks need to be reduced as the pitch between tracks is reduced. Servopattern errors are a significant contribution to the error budget in disk drive designs.

Having described preferred embodiments of a method of improving RRO and AC squeeze, it is noted that modifications and variations can be made by persons skilled in the art in light of the above teachings. It is therefore to be understood that changes can be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for writing a servopattern comprising the steps of:

writing a burst to each of at least two slots of a first servo track;

trimming a burst of at least one slot of the first servo track; and writing a burst to each of at least two slots of a second servo track, wherein at least one burst of the second servo track forms a servo burst with an untrimmed burst of the first servo track, wherein the bursts written to the second servo track are written on a revolution different than a revolution for trimming the burst of the first slot.

2. The method of claim 1, further comprising the step of trimming the at least one burst of the second servo track forming the servo burst.

3. The method of claim 1, wherein errors during each revolution are uncorrelated.

4. The method of claim 1, further comprising the step of defining burst edges of adjacent slots on separate revolutions.

5. The method of claim 4, wherein defining burst edges comprises one of trimming and writing.

6. The method of claim 1, wherein the burst of the second servo track forming the servo burst is written in two portions, each portion being written on a separate revolution.

7. The method of claim 6, wherein each portion of the burst of the second servo track forming the servo burst is trimmed on a separate revolution.

8. The method of claim 6, wherein at least one edge of the servo burst is defined by more than one revolution.

9. The method of claim 6, wherein the servo burst comprises two or more bursts.

10. A method for writing a servopattern comprising the steps of:
    writing a second burst of a first servo burst at a first radial position, the second burst of the first servo burst in combination with a first burst of the first servo burst forming the first servo burst, wherein the first burst of the first servo burst is written prior to the second burst of the first servo burst;
    trimming a portion of an edge of the second burst of the first servo burst; and
    writing a first burst of a second servo burst at a second radial position on a different revolution than trimming the portion of the edge of the second burst of the first servo burst, wherein the edge of the second burst of the first servo burst and an edge of the first burst of the second servo burst have a substantially similar common radial position, and wherein the first servo burst and the second servo burst are adjacent servo bursts in a servo track, and wherein the first bursts of the first and second servo bursts are untrimmed.

11. The method of claim 10, wherein errors during each revolution are uncorrelated.

12. The method of claim 10, wherein the portion of the edge of the second burst of the first servo burst is one of equal to the portion of the edge of the first burst of the second servo burst and unequal to the portion of the edge of the first burst of the second servo burst.

13. The method of claim 10, wherein the portion of the edge of the second burst of the first servo burst is defined by one burst and the portion of the edge of the first burst of the second servo burst is defined by one burst.

14. The method of claim 10, wherein the portion of the edge of the second burst of the first servo burst is defined by one burst and the portion of the edge of the first burst of the second servo burst is defined by multiple bursts.

15. The method of claim 10, wherein the portion of the edge of the second burst of the first servo burst is defined by multiple bursts and the portion of the edge of the first burst of the second servo burst is defined by one burst.

16. A program storage device readable by machine, tangibly embodying a program of instructions executable by the machine to perform method steps for writing a servopattern, the method steps comprising:
    writing a burst to each of at least two slots of a first servo track;
    trimming a burst of at least one slot of the first servo track; and
    writing a burst to each of at least two slots of a second servo track, wherein at least one burst of the second servo track forms a servo burst with an untrimmed burst of the first servo track, wherein the bursts written to the second servo track are written on a revolution different than a revolution for trimming the burst of the first slot.

17. The program storage device performing the method of claim 16, further comprising the step of trimming the at least one burst of the second servo track forming the servo burst.

18. The program storage device performing the method of claim 16, wherein each revolution is uncorrelated.

19. The program storage device performing the method of claim 16, further comprising the step of defining burst edges of adjacent slots on separate revolutions.

20. The program storage device performing the method of claim 19, wherein defining burst edges comprises one of trimming and writing.

21. The method program storage device performing the of claim 16, wherein the burst of the second servo track forming the servo burst is written in two portions, each portion being written on a separate revolution.

22. The method program storage device performing the of claim 21, wherein each portion of the burst of the second servo track forming the servo burst is trimmed on a separate revolution.

23. The method program storage device performing the of claim 16, wherein at least one edge of the servo burst is defined by more than one revolution.

24. The method program storage device performing the of claim 16, wherein the servo burst comprises two or more bursts.

* * * * *